United States Patent
Ells

[11] 3,860,039
[45] Jan. 14, 1975

[54] PIPELINES

[75] Inventor: John William Ells, Bexleyheath, England

[73] Assignee: The British Petroleum Company Limited, London, England

[22] Filed: May 11, 1973

[21] Appl. No.: 359,434

[30] Foreign Application Priority Data
May 26, 1972 Great Britain .................... 24932/72

[52] U.S. Cl. .............................. 138/103, 138/177
[51] Int. Cl. ............................................ F16l 9/22
[58] Field of Search ....... 138/103, 145, 155, DIG. 6, 138/172, 174, 175, 177

[56] References Cited
UNITED STATES PATENTS
2,611,567  9/1952  Williamson .................... 138/103 X
3,096,105  7/1963  Risley ............................ 138/155 X
3,172,428  3/1965  Tudge .......................... 138/172 UX

*Primary Examiner*—Jerry W. Myracle
*Attorney, Agent, or Firm*—Morgan, Finnegan, Durham & Pine

[57] ABSTRACT

A pipeline having an outer diameter of at least 15 inches and a wall thickness of not more than 1 inch has a steel sleeve, whose wall thickness is from 1 to 1½ times that of the pipe. The difference between the outer diameter of the pipe and the inner diameter of the sleeve is from 1 to 4 inches, and the annular space can be filled with cement or bitumen. The purpose of the sleeve is to arrest the propagation of a buckle.

8 Claims, 4 Drawing Figures

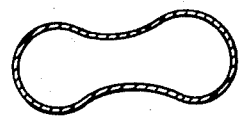
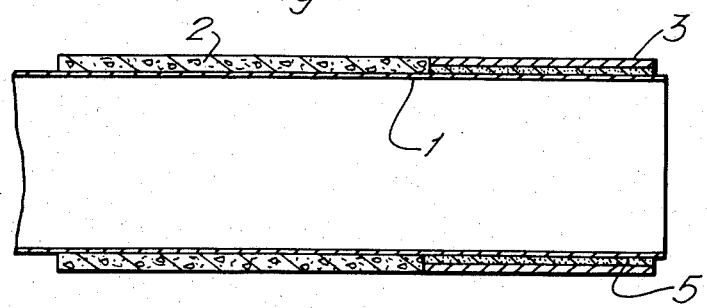
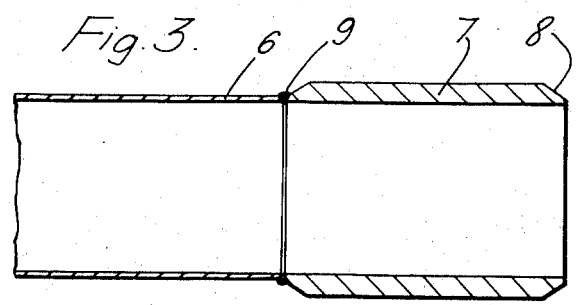
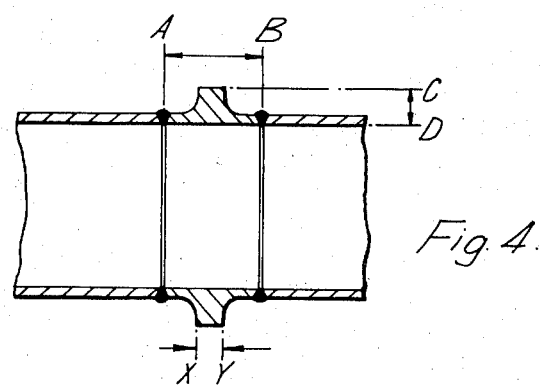

PIPELINES

This invention relates to devices for arresting the propagation of buckles in underwater pipelines.

Pipelines are laid in water by welding lengths of pipe together on a barge and lowering the welded line into the water. As the laying progresses, further lengths of pipe are welded to the free end of the line on the barge.

The problem of pipelines forming a buckle when laid in water has been previously reported. A buckle is a gross deformation of the pipe from its circular cross section to a form where one dimension is increased and the other dimension decreased.

Recently, it has been found that when pipelines having large outer diameters e.g. a 32 inch and wall thicknesses not greater than 1½ inches e.g. three-fourths inch are laid in water at depths over about 400 feet that the combination of bending at the sag bend near where the pipeline meets the bottom and pressure can, sometimes, cause a buckle to form along a length of pipe. The forces required to propagate a buckle are less than the forces required to initiate it, and under these conditions a buckle can form in a very great length of pipe.

A length of pipe has now been invented suitable for joining e.g. by welding to other lengths of pipe to form a pipeline and having a device for arresting the propagation of a buckle.

Thus, according to the present invention there is provided a length of pipe having an outer diameter of 14 to 72 inches and a wall thickness of ¼ to 1½ inches and having a steel sleeve, the wall thickness of the pipe being from ¾ to 2 times the wall thickness of the sleeve and the length of the sleeve in relation to the outer diameter of pipe being from 178:1 to 5:1 and whose inner diameter is not more than 6 inches greater than the outer diameter of the pipe.

Preferably the length of the sleeve in relation to the outer diameter of the pipe is from 1:1 to 3:1. Typically the sleeve is from 1 to 10 feet in length and preferably 2 to 5 feet.

Preferably the pipe and sleeve are made of the same grade steel.

Preferably the wall thickness of the sleeve is from 1 to 1½ times that of the pipe.

Preferably the difference in diameter between the outer diameter of pipe and the inner diameter of the sleeve is not more than 4 inches.

There is no lower limit on the difference, provided the sleeve can be fitted on to the length of pipe. It has been found convenient to make the difference from 1 to 4 inches and the annular space is preferably filled with load bearing medium e.g. a concrete.

Preferably there is interposed between the sleeve and the pipe a layer of corrosion preventing material e.g. bitumen wrap round the pipe.

The steel sleeve can be fitted to the length of pipe by simply placing over a free end and sliding the sleeve to the desired position. It is preferred to fit the sleeve near an end of the pipe over the anticorrosion coating, and then to fill any annular space with load bearing material.

According to another aspect of the present invention a pipeline comprises lengths of pipe welded together, there being situated at intervals along the pipeline lengths of pipe having a steel sleeve as hereinbefore described.

It has been found convenient to situate the steel sleeves so that one is located at every 100 yards to 1 mile along the pipeline.

When the pipeline is to be laid in water it has a concrete weight coating of sufficient thickness to impart an adequate negative buoyancy to the pipeline. Typically the thickness of the concrete coating is from 1 to 4 inches.

Preferably the outer diameter of the sleeve is substantially the same as the outer diameter of the concrete coating so that the surface of the pipeline is effectively smooth. This feature has the purpose of lessening the chance of damaging the coating when the pipeline is passed through rollers in the laying operation.

According to another aspect of the present invention a length of pipeline comprises a first unit of pipe whose outer diameter is from 14 to 72 inches and whose wall thickness is from ¼ to 1½ inches welded to a unit of pipe having a wall thickness from 1¼ to 2½ times the wall thickness of the first unit and a length to outer diameter ratio of from 1:1 to 10:1.

Preferably the first unit is relatively longer than the second unit. Preferably the first units of pipe comprising the pipeline are at least 30 feet in length e.g. a 32 inch pipe of about 40 feet in length and having a wall thickness of three-fourths inch, in which case the length of the relatively shorter units is greater than 4 feet e.g. about 6 feet and has a wall thickness of about 1 inch.

The relatively shorter units of pipe are preferably made of the same grade of steel as the first units of which the pipeline is composed and has ends tapered to the wall thickness of the relatively longer units in order to facilitate welding.

According to another aspect of the present invention a length of pipeline comprises a number of first units of pipe as defined above welded together there being situated at intervals along the pipeline and interposed between and welded to the first units, relatively shorter units as defined above.

The relatively shorter units can, if desired, be interposed between every consecutive pair of relatively longer units but it has been found convenient to situate each one at between 100 yards and 1 mile of pipeline.

According to another aspect of the present invention a unit of pipe suitable for welding to other lengths of pipe to form a pipeline comprises a unit of pipe whose length is from 4 to 12 inches whose outer diameter at its ends is 14 to 72 inches and whose wall thickness at the ends is from ¼ to 1½ inches extending inwardly from each end for at least one inch and having a thickened wall portion which has a maximum wall thickness of 2 to 12 inches.

Preferably the length of the unit is from 6 to 10 inches and the thickened portion provides a maximum wall thickness of from 2 to 4 inches.

The thickened portion is preferably formed as a flange and preferably the flange is situated symmetrically with respect to the ends of the unit of pipe.

Preferably the thickness of the flange at its extremity measured in the direction parallel to the axis of unit of pipe is from 1 to 3 inches.

A particularly preferred unit has a length of 8 inches a wall thickness of three-fourths inch at the ends and a flange symmetrically located with respect to the ends of the unit of pipe providing a maximum wall thickness of 3 inches, the flange having a thickness at its extremity of 2 inches.

This invention is illustrated with reference to the accompanying drawings in which FIG. 1 shows a transverse section of a pipe in which a typical buckle has formed and FIG. 2 shows in longitudinal section a length of pipe having a sleeve fitted thereto. In FIG. 2 the length of pipe 1 having a bitumen anticorrosion wrap (not shown) which is 40 feet long and has an outer diameter of 32 inches and a wall thickness of three-fourths inch has a 3 feet long steel sleeve 3 which is made of steel having a thickness of 1¾ inches. Interposed between the sleeve 3 and the pipe 1 is a layer of concrete 5 which is 1¾ inches in thickness. The pipe 1 also has a protective layer of concrete weight coating 2 which is about 2½ inches in thickness.

FIG. 3 shows in longitudinal section a first unit of pipe 6 of wall thickness three-fourths inch and length 40 feet welded at weld 9 to a relatively shorter unit of pipe 7 having a wall thickness of 1½ inches and a length of 5 feet.

The shorter unit 7 has tapered ends 8 to provide a wall thickness at the ends the same as the ends of the first unit.

The flanged unit is illustrated in FIG. 4 which shows a pipeline in longitudinal section in which part of the pipeline is provided by a unit of pipe having a thickened wall portion. The unit is welded to two lengths of pipe at A and B to form the pipeline. The length A-B is 8 inches, X-Y is 2 inches and the wall thickness of the unit at its end is three-fourths inch, and dimension C-D is 3 inches.

I claim:

1. A length of steel pipe suitable for welding to other similar lengths of steel pipe to form an underwater pipe-line having an outer diameter of from about 14 to about 72 inches and a wall thickness of from about ¼ to about 1½ inches, and having a steel sleeve whose wall thickness is from about ¾ to about 2 times the wall thickness of the pipe, whose length in relation to the outer diameter of the pipe is from about ½:1 to about 5:1, and whose inner diameter is a maximum of about 6 inches greater than the outer diameter of the pipe.

2. A length of steel pipe as claimed in claim 1 wherein the difference between the outer diameter of the pipe and the inner diameter of the sleeve is a maximum of about 4 inches.

3. A length of steel pipe as claimed in claim 1 wherein the difference between the outer diameter of the pipe and the inner diameter of the sleeve is from about 1 to about 4 inches and the annular space therebetween is filled with a load bearing material.

4. A pipeline composed of lengths of steel pipe welded together as claimed in claim 1 with a plurality of sleeves spaced at intervals of about 100 yards to about 1 mile along the pipeline.

5. A length of steel pipe as claimed in claim 1 wherein the wall thickness of the sleeve is from about 1 to about 1½ times the wall thickness of the pipe.

6. A length of steel pipe as claimed in claim 1 wherein the length of the sleeve in relation to the outer diameter of the pipe is from about 1:1 to about 3:1.

7. A length of steel pipe suitable for welding to other similar lengths of steel pipe to form a pipeline having an outer diameter of from about 14 to about 72 inches and a wall thickness of from about ¼ to about 1½ inches, and having a steel sleeve whose wall thickness is from about ¾ to about 2 times the wall thickness of the pipe, whose length in relation to the outer diameter of the pipe is from about ½:1 to about 5:1, and whose inner diameter is a maximum of about 6 inches greater than the outer diameter of the pipe, the pipe including a weight coating, the outer diameter of the steel sleeve being substantially the same as the outer diameter of the weight coating.

8. A length of steel pipe as claimed in claim 7 wherein the wall thickness of the weight coating is from about 1 to about 4 inches.

* * * * *